(12) United States Patent
Thai et al.

(10) Patent No.: US 8,427,956 B1
(45) Date of Patent: Apr. 23, 2013

(54) FACILITATING PACKET FLOW IN A COMMUNICATION NETWORK IMPLEMENTING LOAD BALANCING AND SECURITY OPERATIONS

(75) Inventors: Hien T. Thai, Elk Grove, CA (US); Kevin D. Shatzkarner, New York, NY (US); Andrew G. Gasson, Madrid (ES); Laurent Andriantsiferana, Valbone (FR); Nishant S. Jadhav, Sunnyvale, CA (US); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 758 days.

(21) Appl. No.: 11/369,072

(22) Filed: Mar. 6, 2006

(51) Int. Cl.
*G01R 31/08* (2006.01)

(52) U.S. Cl.
USPC .......................................................... 370/236

(58) Field of Classification Search .................. 370/230, 370/401, 231, 236, 328–9, 338, 348–9
See application file for complete search history.

(56) References Cited

U.S. PATENT DOCUMENTS

| | | | | |
|---|---|---|---|---|
| 4,574,374 | A | 3/1986 | Scordo | 370/62 |
| 5,007,046 | A | 4/1991 | Erving et al. | 370/32.1 |
| 5,058,153 | A | 10/1991 | Carew et al. | 379/390 |
| 5,848,098 | A | 12/1998 | Cheng et al. | 375/220 |
| 6,078,809 | A | 6/2000 | Proctor | 455/416 |
| 6,128,649 | A | 10/2000 | Smith et al. | 709/217 |
| 6,148,068 | A | 11/2000 | Lowery et al. | 379/202 |
| 6,535,604 | B1 | 3/2003 | Provencal et al. | 379/388.06 |
| 6,989,856 | B2 | 1/2006 | Firestone et al. | 348/14.09 |
| 7,061,873 | B2 | 6/2006 | Ito et al. | |
| 7,113,992 | B1 | 9/2006 | Even | 709/227 |
| 2002/0080752 | A1* | 6/2002 | Johansson et al. | 370/338 |
| 2003/0081607 | A1* | 5/2003 | Kavanagh | 370/392 |
| 2003/0097405 | A1* | 5/2003 | Laux et al. | 709/203 |
| 2004/0088409 | A1* | 5/2004 | Braemer et al. | 709/225 |
| 2004/0107234 | A1* | 6/2004 | Rajahalme | 709/200 |
| 2004/0146045 | A1* | 7/2004 | Jimmei et al. | 370/351 |
| 2004/0252761 | A1 | 12/2004 | Brown et al. | 375/240.12 |
| 2005/0005006 | A1* | 1/2005 | Chauffour et al. | 709/223 |
| 2005/0122942 | A1* | 6/2005 | Rhee et al. | 370/338 |
| 2005/0165928 | A1* | 7/2005 | Shu et al. | 709/224 |
| 2005/0281205 | A1* | 12/2005 | Chandwadkar et al. | 370/249 |
| 2006/0293073 | A1 | 12/2006 | Rengaraju et al. | |
| 2010/0030906 | A1* | 2/2010 | Apreutesei et al. | 709/228 |

OTHER PUBLICATIONS

U.S. Appl. No. 11/210,325 entitled, *"System and Method for Performing Distributed Multipoint Video Conferencing"*, 43 pages specification, claims and abstract, 5 pages of drawings, inventors Randall B. Baird, et al., Aug. 24, 2005.

(Continued)

*Primary Examiner* — Mark Rinehart
*Assistant Examiner* — Peter Cheng
(74) *Attorney, Agent, or Firm* — Baker Botts L.L.P.

(57) ABSTRACT

Facilitating packet flow in a communication network includes receiving at a defender a request packet sent from a node. The request packet is communicated to a load balancer operable to communicate the request packet to a network element server selected from a plurality of network element servers. The request packet has a destination address associated with the load balancer. A response packet is received from the network element server. The response packet has a tunnel endpoint address. Whether the tunnel endpoint address corresponds to an approved network element server is determined. The response packet is communicated to the node if the tunnel endpoint address corresponds to an approved network element server.

18 Claims, 1 Drawing Sheet

OTHER PUBLICATIONS

Cisco IOS Mobile Wireless Configuration Guide, Chapter 11, Configuring Load Balancing on the GGSN, www.cisco.com, pp. 11-1-11-28, Printed Feb. 2006.

Cisco IOS Mobile Wireless Configuration Guide, Configuring Load Balancing on the GGSN, www.cisco.com, pp. MWC-221-MWC-238, Printed Feb. 2006.

USPTO; Office Action dated May 4, 2009 for U.S. Appl. No. 11/210,325, filed Aug. 25, 2005 in the name of Randall B. Baird, 10 pages, May 4, 2009.

USPTO; Office Action dated Nov. 4, 2009 for U.S. Appl. No. 11/210,325, filed Aug. 24, 2005 in the name of Randall B. Baird, 10 pages, Nov. 4, 2009.

USPTO; Notice of Allowance and Fee(s) Due dated Apr. 8, 2010 for U.S. Appl. No. 11/210,325, filed Aug. 24, 2005 in the name of Randall B. Baird, 6 pages, Apr. 8, 2010.

Response to Office Action dated May 4, 2009 for U.S. Appl. No. 11/210,325, filed Aug. 24, 2005 in the name of Randall B. Baird, 12 pages, Aug. 4, 2009.

Request for Continued Examination Transmittal and Amendment Filed with Request for Continued Examination for U.S. Appl. No. 11/210,325, filed Aug. 24, 2005 in the name of Randall B. Baird, 13 pages, Jan. 27, 2010.

Request for Continued Examination Transmittal for U.S. Appl. No. 11/210,325, filed Aug. 24, 2005 in the name of Randall B. Baird, 1 page, Jun. 21, 2010.

* cited by examiner

FACILITATING PACKET FLOW IN A COMMUNICATION NETWORK IMPLEMENTING LOAD BALANCING AND SECURITY OPERATIONS

TECHNICAL FIELD

This invention relates generally to the field of telecommunications and more specifically to facilitating packet flow in a communication network implementing load balancing and security operations.

BACKGROUND

As network activity increases in a communication network, efficiency and security may become more important. Load balancing operations may be implemented to increase the efficiency of providing communication sessions. As an example, a load balancer may be used to select a server that may most efficiently process a request. Security operations may be used to protect a communication network. As an example, a defender may be used to detect and prevent unauthorized access.

In certain situations, the communication protocol may not allow the load balancing and security operations to cooperate with each other. In general, it is desirable for load balancing and security operations to cooperate with each other in these situations.

SUMMARY OF THE DISCLOSURE

In accordance with the present invention, disadvantages and problems associated with previous techniques for facilitating packet flow in a communication network may be reduced or eliminated.

According to one embodiment of the present invention, facilitating packet flow in a communication network includes receiving at a defender a request packet sent from a node. The request packet is communicated to a load balancer operable to communicate the request packet to a network element server selected from a plurality of network element servers. The request packet has a destination address associated with the load balancer. A response packet is received from the network element server. The response packet has a tunnel endpoint address. Whether the tunnel endpoint address corresponds to an approved network element server is determined. The response packet is communicated to the node if the tunnel endpoint address corresponds to an approved network element server.

According to another embodiment, the communication network comprises a General Packet Radio Service/Universal Mobile Telecommunications System (GPRS/UMTS) network. The network includes a GPRS tunneling protocol (GTP) load balancer for gateway GPRS support nodes (GGSNs).

Certain embodiments of the invention may provide one or more technical advantages. A technical advantage of one embodiment may be that a defender can determine whether a server is an approved server. The defender sends a request to a load balancer, which forwards the request to an approved server. The approved server then sends a response directly to the defender, which recognizes the server as an approved server. Accordingly, the security operation performed by the defender may cooperate with the load balancing operation performed by the load balancer.

Another technical advantage of one embodiment may be that approved servers may comprise gateway General Packet Radio Services (GPRS) support nodes (GGSNs). Accordingly, security operations and load balancing operations may cooperate in a 3G network. Another technical advantage of one embodiment may be that server identifiers of approved servers may be configured at the defender. Accordingly, the defender may be able to readily identify approved servers.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
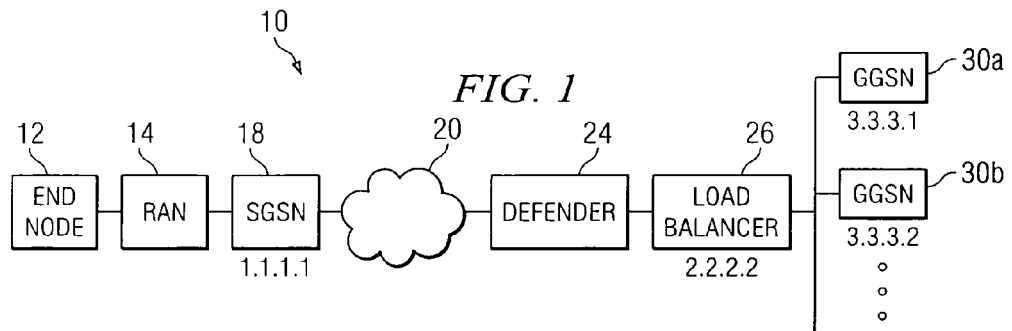
FIG. 1 is a block diagram illustrating one embodiment of a system operable to facilitate packet flow in a communication network implementing load balancing and security operations.
Figure 2:
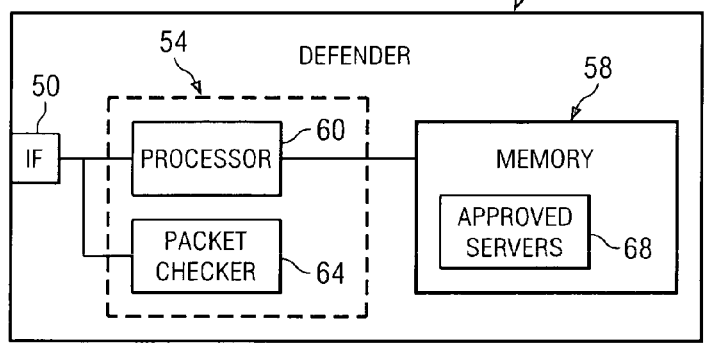
FIG. 2 is a block diagram illustrating one embodiment of a defender that may be used with the system of FIG. 1.
Figure 3:
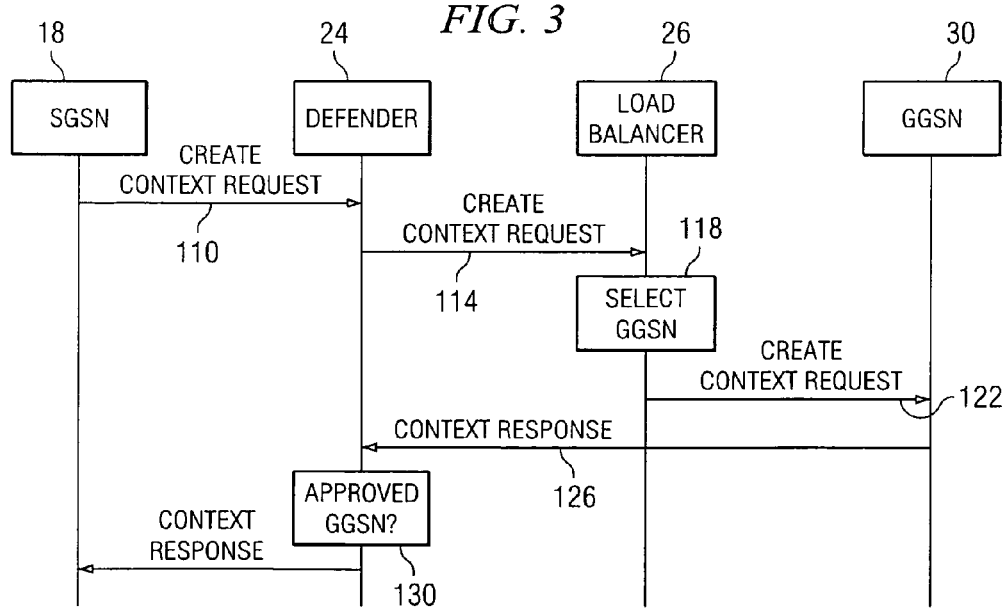
FIG. 3 is a call flow diagram illustrating one embodiment of a method that may be used with the system of FIG. 1.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 operable to facilitate packet flow in a communication network implementing load balancing and security operations. System 10 includes a defender that can determine whether a server is an approved server. The defender sends a request to a load balancer, which forwards the request to an approved server. The approved server then sends a response directly to the defender, which recognizes the server as an approved server. Accordingly, the security operation performed by the defender may cooperate with the load balancing operation performed by the load balancer.

In one example, the communication network comprises a General Packet Radio Service/Universal Mobile Telecommunications System (GPRS/UMTS) network. The network includes a GPRS tunneling protocol (GTP) load balancer for gateway GPRS support nodes (GGSNs). The GGSN specifies the actual tunnel termination IP address, which may be different from the destination of the tunnel setup request. Accordingly, a tunnel create request goes to a destination that is different from the destination of the tunnel setup/teardown messages. A defender compensates for this difference.

According to the illustrated embodiment, system 10 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

System 10 may communicate information in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

According to one embodiment, system 10 may represent a 2G, 2.5G, or 3 G communication network of a Global System for Mobile (GSM) environment or may represent any other suitable communication network. Moreover, system 10 may cooperate with any version of a General Packet Radio Service (GPRS) tunneling protocol (GTP) that includes load balancing operations. GPRS represents a packet-based data bearer service that may be delivered as a network overlay. GPRS generally applies packet-radio and packet switching operations to transfer data packets between GSM elements and external packet data networks. GPRS may support multiple Internet communication protocols and may enable existing platforms, such as IP, X.25, or other suitable platform, to operate over GSM connections.

System 10 includes devices. In general, a device may include any suitable arrangement of components operable to perform the operations of the device, and may comprise logic, an interface, a memory, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes an end node 12, a radio access network (RAN) 14, a serving GPRS support node (SGSN) 18, a communication network 20, a defender 24, a load balancer 26, and gateway GPRS support nodes (GGSNs) 30a-b coupled as shown.

End node 12 represents a device operable to participate in a communication session of system 10. Example end nodes 12 include a computer, a personal digital assistant (PDA), a laptop, a telephone, a mobile station, or any other device capable of communicating with system 10.

RAN 14 represents a communications interface between end node 12 and SGSN 18. RAN 14 may comprise a base transceiver station and a base station controller. RAN 14 offers connectivity and allows data to be exchanged between end node 12 and any number of selected elements of system 10. Other types of communications interfaces may be used based on particular needs.

Network 20 represents a communication network that allows devices such as end node 12 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

According to one embodiment, network 20 comprises an Internet Protocol (IP) network. An IP network comprises a series of nodes of interconnected communication paths for receiving and transmitting packets that propagate through system 10. An IP network may implement a User Datagram Protocol/Internet Protocol (UDP/IP) communication protocol or other suitable communication protocol for transmitting and receiving packets.

SGSN 18 and GGSNs 30a-c represent devices that cooperate to facilitate a communication session involving end node 12. SGSN 18 and GGSNs 30a-c may provide a communications medium in a GPRS service network.

According to one embodiment, GGSNs 30a-c may represent a server farm. A GGSN 30 may be operable to process requests sent from load balancer 26. According to one embodiment, certain GGSNs 30 may be approved servers. An approved server may refer to a server that sends packets that may be accepted by defender 24 and forwarded to a particular node. As an example, an approved server may send packets that may be accepted by defender 24 and forwarded to a particular SGSN 18.

Defender 24 represents a device operable to protect servers from unauthorized access. For example, defender 24 may be an embodied firewall, an intrusion protection system (IPS), a distributed denial of service guard, or other suitable device operable to protect servers from attacks. As an example, defender 24 may represent a CISCO PIX 500 SERIES security appliance provided by CISCO SYSTEMS, INC.

According to one embodiment, defender 24 sends a request packet to a node. As an example, the request packet may comprise a Create Packet Data Protocol (PDP) Context Request message defined by 3rd Generation Partnership Project (3GPP). The request packet includes a destination address identifying the node as the destination. For example, the destination address may identify the Access Point Name (APN) to which the user is attempting to connect, and the IP address of the GGSN that the SGSN received from a previous DNS Query. Defender 24 receives a response packet in response to the request packet. As an example, the response packet may comprise a Create PDP Context Response message. The response packet includes a tunnel endpoint address identifying the sender node that sent the response packet. Defender checks the tunnel endpoint address to determine if the tunnel endpoint address is allowable.

A tunnel endpoint address may be regarded as allowable according to any suitable condition. As an example, the address may be regarded as allowable if the address matches the destination address of the request packet. That is, the node to which the request packet was sent also sent the response packet. As another example, the address may be regarded as allowable if the address comprises an identifier of an approved server. Load balancer 26 represents a device that distributes a Create PDP Context request packet to a GGSN selected from a number of servers according to a load balancing procedure. A load balancing procedure may refer to a procedure used to select a real network element from a set of servers, and is typically designed to balance the work load among the set of servers. Example load balancing procedures include round robin, least connections, weighted round robin, and weighted least connections procedures. Load balancer 26 may be embodied in a load balancing device or in any suitable network device such as a router, a switch, a bridge, a gateway, or other suitable device. As an example, load balancer 26 may represent a CISCO IOS SERVER LOAD BALANCER.

A device of system 10 may have a corresponding identifier that uniquely identifies the device. The identifier may comprise, for example, an address such as an IP address. According to the illustrated embodiment, SGSN 18 has an identifier 1.1.1.1, load balancer 26 has an identifier 2.2.2.2, GGSN 30*a* has an identifier 3.3.3.1, GGSN 30*b* has an identifier 3.3.3.2, and GGSN 30*c* has an identifier 3.3.3.3.

According to one embodiment of operation, defender forwards a request packet from SGSN 18 to load balancer 26. The request packet includes the identifier of load balancer 26 as the destination address. Defender 24 receives a response packet from a GGSN 30*a* selected by load balancer 26. The response packet includes a tunnel endpoint address identifying GGSN 30*a* as the sender node. Defender checks the address to determine if the response packet is acceptable. As an example, if GGSN 30*a* is an approved server for request packets from SGSN 18, then the response packet can be accepted and forwarded to SGSN 18.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a block diagram illustrating one embodiment of a defender 24 that may be used with system of FIG. 1. Defender 24 determines whether the tunnel endpoint address of the response packet corresponds to an approved server.

According to the illustrated embodiment, defender 24 comprises a interface 50, logic 54, and memory 58 coupled as shown. Interface 50, logic 54, and memory 58 may be as described with reference to FIG. 1. Logic 54 includes a processor 60 and a packet checker 64, and memory 58 stores a list 68 of approved servers. Processor 60 may be as described with reference to FIG. 1.

Packet checker 64 establishes the acceptability of a packet, such as a response packet sent in response to a request packet. A response packet may be regarded as acceptable according to any suitable condition. As an example, the response packet may be regarded as acceptable if the tunnel endpoint address of the response packet matches the destination address of the request packet. That is, the node to which the request packet was sent also sent the response packet.

As another example, the response packet may be regarded as acceptable if the tunnel endpoint address comprises an identifier of an approved server. Packet checker 64 may determine if the address comprises an identifier of an approved server in any suitable manner.

In one embodiment, packet checker 64 may check list 68 of approved servers. In another embodiment, packet checker 64 may check whether the address is specified in the PDP context, which may be retrieved from the request packet. Certain types of request packets may already include this information. If not, a variable that includes this information may be added to the request packet.

Packet checker 64 may use any suitable commands to establish the acceptability of a packet. As an example, packet checker 64 may use an approved pool command to set up list 68 of approved servers. According to one embodiment, list 68 of approved servers may comprise IP addresses of approved GGSNs 30*a-c*. According to the identifiers illustrated in FIG. 1, the specified addresses may include 3.3.3.1, 3.3.3.2, and 3.3.3.3, representing GGSNs 30*a-c*, respectively.

The IP address specified in an approved pool command may comprise any suitable address. As an example, the specified address may comprise the real address of a device, whether or not network address translation is supported. If network address translation is not supported, the specified address is clearly the real address. If network address translation is supported, the specified address would be the address seen on the interface, not the external global address.

As another example, packet checker 64 may use a hash request command to hash a request packet. A request packet may be hashed in any suitable manner. As an example, a request packet may be hashed according to IP address, sequence number, and a tunnel identifier (TID). In the example, the hash request command may remove the destination address since the destination address may be different than the tunnel endpoint address of the response packet. The request packet may still be uniquely identified based on the tunnel identifier and the IP address.

As another example, packet checker 64 may use a permit response command that allows for responses from specified servers to be sent to specified nodes.

According to one embodiment, a permit response command may allow for responses from specified GGSNs 30 to be sent to specified SGSNs 18. For example, a permit command may have the following format:

| permit response | to [object group SGSN] from [object group GGSN] | where object group SGSN includes identifiers of one or more SGSNs, and object GGSNs includes identifiers of one or more GGSNs. The permit response command allows for SGSNs specified in object group SGSNs to receive responses sent from GGSNs specified in object group GGSNs.

Modifications, additions, or omissions may be made to defender 24 without departing from the scope of the invention. The components of defender 24 may be integrated or separated according to particular needs. Moreover, the operations of defender 24 may be performed by more, fewer, or other modules. Additionally, operations of defender 24 may be performed using any suitable logic.

FIG. 3 is a call flow diagram illustrating one embodiment of a method that may be used with system 10 of FIG. 1. The method begins at step 110, where SGSN 18 sends a create context message to defender 24. A create context message may be used to initiate a communication session and may comprise, for example, a Create Packet Data Protocol (PDP) Context message. The create context message may have a destination address that corresponds to load balancer 26. As an example, the destination address may comprise a virtual IP address for load balancer 26.

Defender 24 forwards the create context message to load balancer 26 at step 114. Load balancer 26 selects a GGSN 30*a* at step 118. GGSN 30*a* may be selected according to any suitable load balancing procedure. Load balancer forwards the create context message to the selected GGSN 30*a* at step 122. The create context message may be forwarded by performing a network address translation on the destination address of the create context message.

GGSN 30*a* sends a create context response message to defender 24 at step 126. A create context response message may refer to a message that indicates that a create context message has been received, and may comprise, for example, a Create PDP Context Response message. The create context response message includes a tunnel endpoint address comprising the identifier of the selected GGSN 30a.

Defender 24 establishes whether the packet is acceptable at step 130. The tunnel endpoint address does not include the identifier of load balancer 26, the node to which the create context message was sent, so defender establishes whether the address corresponds to the identifier of an approved GGSN 30. Defender 24 may use list 68 of approved servers to determine whether the address identifies an approved server. If the packet is acceptable, defender 24 forwards the create context response message at step 134. If the packet is not acceptable, the create context response message is dropped.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a defender can determine whether a server is an approved server. The defender sends a request to a load balancer, which forwards the request to an approved server. The approved server then sends a response directly to the defender, which recognizes the server as an approved server. Accordingly, the security operation performed by the defender may cooperate with the load balancing operation performed by the load balancer.

Another technical advantage of one embodiment may be that approved servers may comprise gateway General Packet Radio Services (GPRS) support nodes (GGSNs). Accordingly, security operations and load balancing operations may cooperate in a 3G network. Another technical advantage of one embodiment may be that server identifiers of approved servers may be configured at the defender. Accordingly, the defender may be able to readily identify approved servers.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for facilitating packet flow in a communication network, comprising:
   receiving at a defender a request message sent from a node;
   communicating, from the defender, the request message to a load balancer, the request message having a destination address associated with the load balancer, the load balancer configured to communicate the request packet to a network element server selected from a plurality of network element servers;
   receiving, at the defender, a response message from the network element server, the response message comprising a reference to the request message;
   determining, at the defender, that the response message has a source address different from the destination address of the request message, the source address identifying the network element server as a source;
   in response to determining that the response message has a source address different from the destination address of the request message, determining, at the defender, whether the source address of the response message is included in a list of addresses of approved servers, the list of addresses of approved servers stored at the defender; and
   communicating, from the defender, the response message to the node if the source address corresponds to an approved network element server.

2. The method of claim 1, wherein the plurality of network element servers comprises a plurality of gateway General Packet Radio Services (GPRS) support nodes (GGSNs).

3. The method of claim 1, wherein the node comprises a serving General Packet Radio Services (GPRS) support node (SGSN).

4. The method of claim 1, wherein:
   the request message comprises a Create Packet Data Protocol (PDP) Context Request message; and
   the response message comprises a Create PDP Context Response message.

5. The method of claim 1, further comprising:
   establishing the list of addresses of approved servers by:
      establishing that each network element server corresponding to each address in the list of addresses of approved servers is an approved network element server; and
      storing a plurality of network element server addresses in the list of addresses of approved servers, each address of the plurality of network element server addresses corresponding to an approved network element server.

6. A defender configured to facilitate packet flow in a communication network, comprising:
   an interface configured to:
      receive a request message sent from a node; and
   a non-transitory computer-readable medium comprising logic coupled to the interface, the logic configured to:
      communicate the request message to a load balancer, the request message having a destination address associated with the load balancer, the load balancer configured to communicate the request packet to a network element server selected from a plurality of network element servers;
   the interface further configured to:
      receive a response message from the network element server, the response message comprising a reference to the request message; and
   the logic further configured to:
      determine that the response message has a source address different from the destination address of the request message, the source address identifying the network element server as a source;
      in response to determining that the response message has a source address different from the destination address of the request message, determine whether the source address of the response message is included in a list of addresses of approved servers, the list of addresses of approved servers stored at the defender; and
      communicate the response message to the node if the source address corresponds to an approved network element server.

7. The defender of claim 6, wherein the plurality of network element servers comprises a plurality of gateway General Packet Radio Services (GPRS) support nodes (GGSNs).

8. The defender of claim 6, wherein the node comprises a serving General Packet Radio Services (GPRS) support node (SGSN).

9. The defender of claim 6, wherein:
the request message comprises a Create Packet Data Protocol (PDP) Context Request message; and
the response message comprises a Create PDP Context Response message.

10. The defender of claim 6, the logic further operable to:
establish the list of addresses of approved servers by:
establishing that each network element server corresponding to each address in the list of addresses of approved servers is an approved network element server; and
storing a plurality of network element server addresses in the list of addresses of approved servers, each address of the plurality of network element server addresses corresponding to an approved network element server.

11. The defender of claim 6, wherein:
the plurality of network element servers comprises a plurality of gateway General Packet Radio Services (GPRS) support nodes (GGSNs);
the node comprises a serving General Packet Radio Services (GPRS) support node (SGSN);
the request message comprises a Create Packet Data Protocol (PDP) Context Request message;
the response message comprises a Create PDP Context Response message; and
the logic is further operable to:
establish that each network element server corresponding to each address in the list of addresses of approved servers is an approved network element server; and
store a plurality of network element server addresses in the list of addresses of approved servers, each address of the plurality of network element server addresses corresponding to an approved network element server.

12. At least one non-transitory computer-readable medium storing instructions that, when executed by at least one processor, are configured to:
receive at a defender a request message sent from a node;
communicate, from the defender, the request message to a load balancer, the request message having a destination address associated with the load balancer, the load balancer comprising a device and logic, the load balancer configured to communicate the request packet to a network element server selected from a plurality of network element servers;
receive, at the defender, a response message from the network element server, the response message comprising a reference to the request message;
determine, at the defender, that the response message has a source address different from the destination address of the request message, the source address identifying the network element server as a source;
in response to determining that the response message has a source address different from the destination address of the request message, determine, at the defender, whether the source address of the response message is included in a list of addresses of approved servers, the list of addresses of approved servers stored at the defender; and
communicate, from the defender, the response message to the node if the source address corresponds to an approved network element server.

13. A system for facilitating packet flow in a communication network, comprising:
a defender configured to:
receive a request message sent from a node, the request message having a destination address associated with the load balancer; and
a load balancer coupled to the defender, the load balancer configured to:
receive the request message from the defender; and
communicate the request message to a network element server selected from a plurality of network element servers;
the defender further configured to:
receive a response message from the network element server, the response message comprising a reference to the request message;
determine that the response message has a source address different from the destination address of the request message, the source address identifying the network element server as a source;
in response to determining that the response message has a source address different from the destination address of the request message, determine whether the source address is included in a list of addresses of approved servers, the list of addresses of approved servers stored at the defender; and
communicate the response message to the node if the source address corresponds to an approved network element server.

14. The system of claim 13, further comprising:
the plurality of network element servers, the plurality of network element servers comprising a plurality of gateway General Packet Radio Services (GPRS) support nodes (GGSNs).

15. The system of claim 13, further comprising:
the node, the node comprising a serving General Packet Radio Services (GPRS) support node (SGSN).

16. The system of claim 13, wherein:
the request message comprises a Create Packet Data Protocol (PDP) Context Request message; and
the response message comprises a Create PDP Context Response message.

17. The system of claim 13, the defender further operable to:
establish the list of approved servers by:
establishing that each network element server corresponding to each address in the list of addresses of approved servers is an approved network element server; and
storing a plurality of network element server addresses in the list of addresses of approved servers, each address of the plurality of network element server addresses corresponding to an approved network element server.

18. The system of claim 13 further comprising:
the plurality of network element servers, the plurality of network element servers comprising a plurality of gateway General Packet Radio Services (GPRS) support nodes (GGSNs);
the node, the node comprising a serving General Packet Radio Services (GPRS) support node (SGSN); and
wherein:
the request message comprises a Create Packet Data Protocol (PDP) Context Request message;
the response message comprises a Create PDP Context Response message; and the defender is further operable to:
   establish the list of addresses of approved servers by:
      establishing that each network element server corresponding to each address in the list of addresses of approved servers is an approved network element server; and
      storing a plurality of network element server addresses in the list of addresses of approved servers, each address of the plurality of network element server addresses corresponding to an approved network element server.

\* \* \* \* \*